(12) United States Patent
Lee et al.

(10) Patent No.: US 8,798,381 B2
(45) Date of Patent: *Aug. 5, 2014

(54) METHOD AND APPARATUS FOR ENCODING AND DECODING IMAGE BY USING LARGE TRANSFORMATION UNIT

(71) Applicant: Samsung Electronics Co., Ltd., Suwon-si (KR)

(72) Inventors: Tammy Lee, Seoul (KR); Woo-jin Han, Suwon-si (KR); Jianle Chen, Suwon-si (KR); Hae-kyung Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/969,721

(22) Filed: Aug. 19, 2013

(65) Prior Publication Data

US 2013/0336390 A1 Dec. 19, 2013

Related U.S. Application Data

(63) Continuation of application No. 13/670,149, filed on Nov. 6, 2012, now Pat. No. 8,515,190, which is a continuation of application No. 13/487,371, filed on Jun. 4, 2012, now Pat. No. 8,311,348, which is a continuation of application No. 13/348,134, filed on Jan. 11, 2012, now Pat. No. 8,204,320, which is a continuation of application No. 12/855,884, filed on Aug. 13, 2010.

(30) Foreign Application Priority Data

Aug. 13, 2009 (KR) .................. 10-2009-0074895

(51) Int. Cl.
*G06K 9/36* (2006.01)
*H04N 7/12* (2006.01)
*H04N 7/26* (2006.01)
*H04N 7/50* (2006.01)

(52) U.S. Cl.
CPC ..... *H04N 19/00781* (2013.01); *H04N 19/0003* (2013.01); *H04N 19/00884* (2013.01); *H04N 19/00278* (2013.01); *H04N 19/00969* (2013.01); *H04N 19/00072* (2013.01); *H04N 19/00084* (2013.01)
USPC .......................... 382/232; 348/384.1; 375/240

(58) Field of Classification Search
CPC .................. H04N 19/00781; H04N 19/00278; H04N 19/00072; H04N 19/00084; H04N 19/00569; H04N 19/00121; H04N 19/00024; H04N 19/00042; H04N 19/00696; H04N 19/22424; H04N 19/00218; H04N 21/440227; H04N 7/32; H04N 19/00793; G06T 9/004
See application file for complete search history.

(56) References Cited

U.S. PATENT DOCUMENTS 5,446,806 A 8/1995 Ran et al.
5,598,514 A 1/1997 Purcell et al.
(Continued)

FOREIGN PATENT DOCUMENTS

CN 1857001 A 11/2006
JP 10-178639 A 6/1998
(Continued)

OTHER PUBLICATIONS

International Search Report (PCT/ISA/220), dated Apr. 22, 2011, issued in Application No. PCT/KR2010/005327.

(Continued)

*Primary Examiner* — Manav Seth
(74) *Attorney, Agent, or Firm* — Sughrue Mion, PLLC

(57) ABSTRACT

Disclosed are an image encoding method and apparatus for encoding an image by grouping a plurality of adjacent prediction units into a transformation unit and transforming the plurality of adjacent prediction into a frequency domain, and an image decoding method and apparatus for decoding an image encoded by using the image encoding method and apparatus.

3 Claims, 13 Drawing Sheets

(56) References Cited

U.S. PATENT DOCUMENTS

| | | | |
|---|---|---|---|
| 5,610,657 A | | 3/1997 | Zhang |
| 5,680,129 A | * | 10/1997 | Weinberger et al. ............. 341/65 |
| 5,731,840 A | * | 3/1998 | Kikuchi et al. .......... 375/240.16 |
| 5,764,805 A | | 6/1998 | Martucci et al. |
| 5,790,695 A | * | 8/1998 | Suwa ............................ 382/166 |
| 5,852,469 A | | 12/1998 | Nagai et al. |
| 5,878,169 A | * | 3/1999 | Miyamoto .................... 382/236 |
| 5,883,673 A | * | 3/1999 | Miyamoto ............... 375/240.12 |
| 5,912,706 A | | 6/1999 | Kikuchi et al. |
| 5,956,467 A | * | 9/1999 | Rabbani et al. ................ 358/1.9 |
| 5,978,592 A | | 11/1999 | Wise |
| 5,995,080 A | | 11/1999 | Biro et al. |
| 5,995,150 A | | 11/1999 | Hsieh et al. |
| 6,071,004 A | | 6/2000 | Le Gall et al. |
| 6,101,276 A | | 8/2000 | Adiletta et al. |
| 6,157,746 A | | 12/2000 | Sodagar et al. |
| 6,173,013 B1 | | 1/2001 | Suzuki et al. |
| 6,212,236 B1 | | 4/2001 | Nishida et al. |
| 6,236,758 B1 | | 5/2001 | Sodagar et al. |
| 6,292,589 B1 | | 9/2001 | Chow et al. |
| 6,292,591 B1 | | 9/2001 | Kondo |
| 6,363,119 B1 | | 3/2002 | Oami |
| 6,393,060 B1 | | 5/2002 | Jeong |
| 6,785,425 B1 | * | 8/2004 | Feder et al. .................... 382/247 |
| 7,006,698 B2 | | 2/2006 | Adiletta et al. |
| 7,116,830 B2 | | 10/2006 | Srinivasan |
| 7,149,811 B2 | | 12/2006 | Wise et al. |
| 7,162,093 B2 | | 1/2007 | Regunathan |
| 7,317,839 B2 | | 1/2008 | Holcomb |
| 7,565,020 B2 | | 7/2009 | Wu et al. |
| 7,580,584 B2 | | 8/2009 | Holcomb et al. |
| 8,086,052 B2 | | 12/2011 | Toth et al. |
| 8,204,320 B2 | * | 6/2012 | Lee et al. ...................... 382/232 |
| 8,311,348 B2 | * | 11/2012 | Lee et al. ...................... 382/232 |
| 8,515,190 B2 | * | 8/2013 | Lee et al. ...................... 382/232 |
| 2001/0016006 A1 | | 8/2001 | Kadono |
| 2003/0112870 A1 | | 6/2003 | Fukuda et al. |
| 2009/0046781 A1 | | 2/2009 | Moriya et al. |
| 2009/0144357 A1 | | 6/2009 | Cope et al. |
| 2009/0196517 A1 | | 8/2009 | Divorra Escoda et al. |
| 2010/0054330 A1 | | 3/2010 | Chen et al. |
| 2010/0086030 A1 | | 4/2010 | Chen et al. |

FOREIGN PATENT DOCUMENTS

| | | |
|---|---|---|
| JP | 11-146367 A | 5/1999 |
| JP | 2003-250161 A | 9/2003 |
| KR | 10-2000-0053028 A | 8/2000 |
| KR | 10-2006-0027795 A | 3/2006 |
| KR | 10-2007-0026289 A | 3/2007 |
| RU | 2011117578 A | 11/2012 |
| WO | 98/20457 | 5/1998 |
| WO | 2004/104930 A2 | 12/2004 |
| WO | 2007/034918 A1 | 3/2007 |
| WO | 2011/019234 A3 | 2/2011 |

OTHER PUBLICATIONS

Communication dated Jan. 16, 2013, issued by the Russian Federal Service for Intellectual Property in counterpart Russian Application No. 2012104828/07.

Communication from the Australian Patent Office dated Apr. 18, 2013, in a counterpart application No. 2010283113.

Communication, dated May 31, 2013, issued by the Indonesia Patent Office in counterpart Indonesian Application No. W-00201200954.

Communication dated Aug. 6, 2013, issued by the Japanese Patent Office in Japanese Application No. 2013-127564.

Communication dated Aug. 6, 2013, issued by the Japanese Patent Office in Japanese Application No. 2013-127565.

Kim, Jaiel et al., "Enlarging MB size for high fidelity video coding beyond HD", ITU-Telecommunications Standardization Sector, Study Group 16 Question 6, Video Coding Experts Group, Oct. 8-10, 2008, pp. 1-6.

Yamamoto, Tomoyuki et al., "Analysis on Transform and Partition Selection in Extended Block Sizes and Modification of Block Transforms", ITU-Telecommunications Standardization Sector, Study Group 16 Question 6, Video Coding Experts Group, Apr. 15-18, 2009, pp. 1-5.

Chen, et al., "Video Coding Using Extended Block Sizes", 36th VCEG Meeting, Video Coding Experts Group of ITU-T Study Group 16, San Diego, USA, Oct. 8-10, 2008, pp. 1-3.

Ma, et al., "High-definition Video Coding with Super-macroblocks", Visual Communications and Processing 2007, Jan. 30, 2007, 12 pages total.

Wien, et al., "Variable Block-Size Transforms for Hybrid Video Coding", Feb. 3, 2004, pp. 1-183.

McCann, et al., "Samsung's Response to the Call for Proposals on Video Compression Technology", Joint Collaborative Team on Video Coding (JCT-VC) of ITU-T SG16 WP3 and ISO/IEC JTC/SC29/WG11, 1st Meeting, Dresden, DE, Apr. 15-23, 2010, pp. 1-42.

Communication dated Apr. 3, 2014 issued by the State Intellectual Property Office of P.R. China in counterpart Chinese Application No. 201080036020.4.

Communication dated Jan. 16, 2014 issued by the Canadian Intellectual Property Office in counterpart Canadian Application No. 2,768,181.

Communication dated May 16, 2014 issued by the Canadian Intellectual Property Office in counterpart Canadian Patent Application No. 2,815,777.

Communication dated Apr. 30, 2014 issued by the Intellectual Property Corporation of Malaysia in counterpart Malaysian Patent Application No. PI 2012000196.

Communication dated May 20, 2014 issued by the Korean Intellectual Property Office in counterpart Korean Patent Application No. 10-2013-0035964.

Communication dated May 7, 2014 issued by the Japanese Patent Office in counterpart Japanese Patent Application No. 2012-524649.

Zhang, Huipin et al., "Region-Based Coding of Motion Fields for Low-Bitrate Video Compression," International Conference on Image Processing (ICIP), IEEE, Oct. 24-27, 2004, vol. 2, 8 pages total.

* cited by examiner

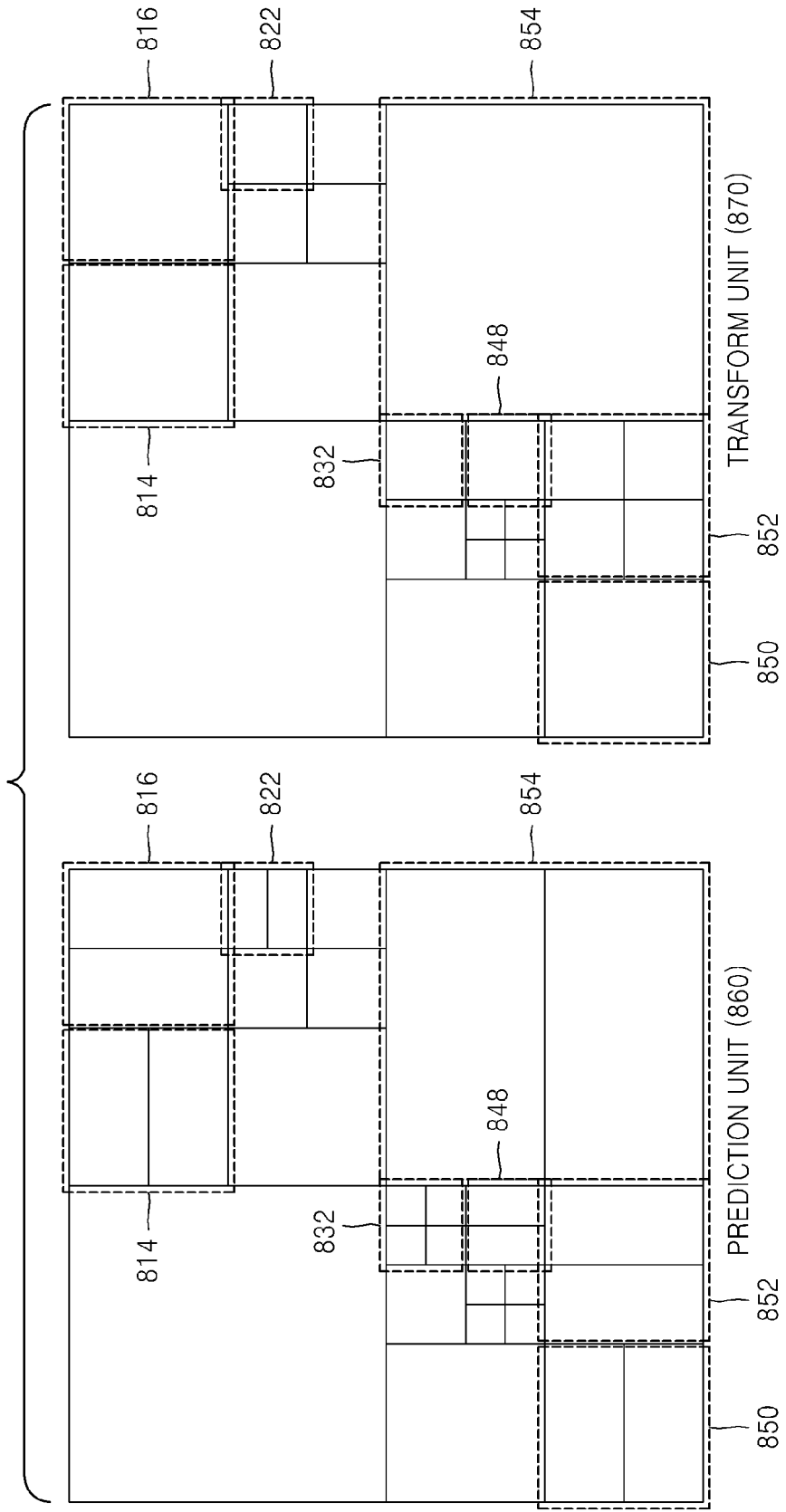

METHOD AND APPARATUS FOR ENCODING AND DECODING IMAGE BY USING LARGE TRANSFORMATION UNIT

CROSS-REFERENCE TO RELATED PATENT APPLICATION

This application is a continuation of U.S. application Ser. No. 13/670,149, filed in the U.S. Patent and Trademark Office on Nov. 6, 2012, which is a continuation of U.S. application Ser. No. 13/487,371, filed in the U.S. Patent and Trademark Office on Jun. 4, 2012, now U.S. Pat. No. 8,311,348, which is a continuation of Ser. No. 13/348,134, filed in the U.S. Patent and Trademark Office on Jan. 11, 2012, now U.S. Pat. No. 8,204,320, which is a continuation of U.S. application Ser. No. 12/855,884, filed in the U.S. Patent and Trademark Office on Aug. 13, 2010, which claims priority from Korean Patent Application No. 10-2009-0074895, filed on Aug. 13, 2009, in the Korean Intellectual Property Office, the disclosures of which are incorporated herein by reference in their entireties.

BACKGROUND

1. Field

The exemplary embodiments relate to a method and apparatus for encoding and decoding an image, and more particularly, to a method and apparatus for encoding and decoding an image by transforming an image of a pixel domain into coefficients of a frequency domain.

2. Description of the Related Art

In order to perform image compression, most of image encoding and decoding methods and apparatuses encode an image by transforming an image of a pixel domain into coefficients of a frequency domain. A discrete cosine transform (DCT), which is one of frequency transform techniques, is a well-known technique that is widely used in image or sound compression. An image encoding method using the DCT involves performing the DCT on an image of a pixel domain, generating discrete cosine coefficients, quantizing the generated discrete cosine coefficients, and performing entropy coding on the generated discrete cosine coefficients.

SUMMARY

The exemplary embodiments provide a method and apparatus for encoding and decoding an image by using more efficient discrete cosine transform (DCT), and also provide a computer readable recording medium having recorded thereon a program for executing the method.

According to an aspect of an exemplary embodiment, there is provided an image encoding method including the operations of setting a transformation unit by selecting a plurality of adjacent prediction units; and transforming the plurality of adjacent prediction units into a frequency domain according to the transformation unit, and generating frequency component coefficients; quantizing the frequency component coefficients; and performing entropy encoding on the quantized frequency component coefficients.

The operation of setting the transformation unit may be performed based on a depth indicating a level of size-reduction that is gradually performed from a maximum coding unit of a current slice or a current picture to a sub-coding unit comprising the plurality of adjacent prediction units.

The operation of setting the transformation unit may be performed by selecting a plurality of adjacent prediction units on which prediction is performed according to a same prediction mode.

The same prediction mode may be an inter-prediction mode or an intra-prediction mode.

The image encoding method may further include the operation of setting an optimal transformation unit by repeatedly performing the aforementioned operations on different transformation units, wherein the aforementioned operations include the operations of setting the transformation unit by selecting a plurality of adjacent prediction units, transforming the plurality of adjacent prediction units into the frequency domain according to the transformation unit and generating the frequency component coefficients, quantizing the frequency component coefficients and performing the entropy encoding on the quantized frequency component coefficients.

According to another aspect of an exemplary embodiment, there is provided an image encoding apparatus including a transformer for setting a transformation unit by selecting a plurality of adjacent prediction units, transforming the plurality of adjacent prediction units into a frequency domain according to the transformation unit, and generating frequency component coefficients; a quantization unit for quantizing the frequency component coefficients; and an entropy encoding unit for performing entropy encoding on the quantized frequency component coefficients.

According to another aspect of an exemplary embodiment, there is provided an image decoding method include the operations of entropy-decoding frequency component coefficients that are generated by being transformed to a frequency domain according to a transformation unit; inverse-quantizing the frequency component coefficients; and inverse-transforming the frequency component coefficients into a pixel domain, and reconstructing a plurality of adjacent prediction units comprised in the transformation unit.

According to another aspect of an exemplary embodiment, there is provided an image decoding apparatus including an entropy decoder for entropy-decoding frequency component coefficients that are generated by being transformed to a frequency domain according to a transformation unit; an inverse-quantization unit for inverse-quantizing the frequency component coefficients; and an inverse-transformer for inverse-transforming the frequency component coefficients into a pixel domain, and reconstructing a plurality of adjacent prediction units comprised in the transformation unit.

According to another aspect of an exemplary embodiment, there is provided a computer readable recording medium having recorded thereon a program for executing the image encoding and decoding methods.

BRIEF DESCRIPTION OF THE DRAWINGS

The above and other features of the exemplary embodiments will become more apparent by describing in detail exemplary embodiments thereof with reference to the attached drawings in which:

FIGS. 8A and 8B illustrate division shapes of a maximum coding unit, a prediction unit, and a transformation unit according to another exemplary embodiment;

DETAILED DESCRIPTION

Hereinafter, the exemplary embodiments will be described in detail with reference to the attached drawings. In the exemplary embodiments, "unit" may or may not refer to a unit of size, depending on its context, and "image" may denote a still image for a video or a moving image, that is, the video itself.

Figure 1:
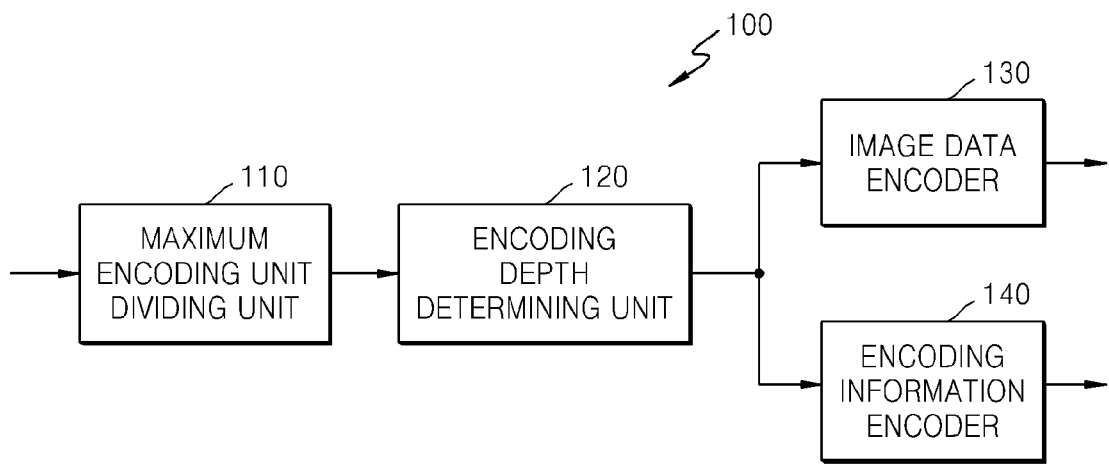
FIG. 1 is a block diagram of an image encoding apparatus according to an exemplary embodiment.

FIG. 1 is a block diagram of an apparatus 100 for encoding an image, according to an exemplary embodiment.

Referring to FIG. 1, the apparatus 100 includes a maximum encoding unit dividing unit 110, an encoding depth determining unit 120, an image data encoder 130, and an encoding information encoder 140.

The maximum encoding unit dividing unit 110 can divide a current picture or slice based on a maximum coding unit that is an encoding unit of the largest size. That is, the maximum encoding unit dividing unit 110 can divide the current picture or slice to obtain at least one maximum coding unit.

According to an exemplary embodiment, an encoding unit can be represented using a maximum coding unit and a depth. As described above, the maximum coding unit indicates an encoding unit having the largest size from among coding units of the current picture, and the depth indicates the size of a sub coding unit obtained by hierarchically decreasing the coding unit. As a depth increases, a coding unit can decrease in size from a maximum coding unit to a minimum coding unit, wherein a depth of the maximum coding unit is defined as a minimum depth and a depth of the minimum coding unit is defined as a maximum depth. Since the size of an coding unit decreases from a maximum coding unit as a depth increases, a sub coding unit of a $k^{th}$ depth can include a plurality of sub coding units of a $(k+n)^{th}$ depth (k and n are integers equal to or greater than 1).

According to an increase of the size of a picture to be encoded, encoding an image in a greater coding unit can result in a higher image compression ratio. However, if a greater coding unit is fixed, an image cannot be efficiently encoded by taking into account the continuously changing image characteristics.

For example, when a smooth area such as the sea or sky is encoded, the greater an coding unit is, the compression ratio can increase. However, when a complex area such as people or buildings is encoded, the smaller an coding unit is, the more a compression ratio can increase.

Accordingly, according to an exemplary embodiment, a different maximum image coding unit and a different maximum depth are set for each picture or slice. Since a maximum depth denotes the maximum number of times by which a coding unit can decrease, the size of each minimum coding unit included in a maximum image coding unit can be variably set according to a maximum depth.

The encoding depth determining unit 120 determines a maximum depth. The maximum depth can be determined based on calculation of Rate-Distortion (R-D) cost. The maximum depth may be determined differently for each picture or slice or for each maximum coding unit. The determined maximum depth is provided to the encoding information encoder 140, and image data according to maximum coding units is provided to the image data encoder 130.

The maximum depth denotes a coding unit having the smallest size, which can be included in a maximum coding unit, i.e., a minimum coding unit. In other words, a maximum coding unit can be divided into sub coding units having different sizes according to different depths. This is described in detail later with reference to FIGS. 8A and 8B. In addition, the sub coding units having different sizes, which are included in the maximum coding unit, can be predicted or transformed based on processing units having different sizes. In other words, the apparatus 100 can perform a plurality of processing operations for image encoding based on processing units having various sizes and various shapes. To encode image data, processing operations such as prediction, transformation, and entropy encoding are performed, wherein processing units having the same size may be used for every operation or processing units having different sizes may be used for every operation.

For example, the apparatus 100 can select a processing unit that is different from a coding unit to predict the coding unit.

When the size of a coding unit is 2N×2N (where N is a positive integer), processing units for prediction may be 2N×2N, 2N×N, N×2N, and N×N. In other words, motion prediction may be performed based on a processing unit having a shape whereby at least one of height and width of a coding unit is equally divided by two. Hereinafter, a processing unit, which is the base of prediction, is defined as a 'prediction unit'.

A prediction mode may be at least one of an intra mode, an inter mode, and a skip mode, and a specific prediction mode can be performed for only a prediction unit having a specific size or shape. For example, the intra mode can be performed for only prediction units having the sizes of 2N×2N and N×N of which the shape is a square. Further, the skip mode can be performed for only a prediction unit having the size of 2N×2N. If a plurality of prediction units exist in a coding unit, the prediction mode with the least encoding errors can be selected after performing prediction for every prediction unit.

Alternatively, the apparatus 100 can perform frequency transformation on image data based on a processing unit having a different size from a coding unit. For the frequency transformation in the coding unit, the frequency transformation can be performed based on a processing unit having a size equal to or smaller than that of the coding unit. Hereinafter, a processing unit, which is the base of frequency transformation, is defined as a 'transformation unit'. The frequency transformation may be a Discrete Cosine Transform (DCT) or a Karhunen Loeve Transform (KLT).

The encoding depth determining unit 120 can determine sub coding units included in a maximum coding unit using RD optimization based on a Lagrangian multiplier. In other words, the encoding depth determining unit 120 can determine the shapes of a plurality of sub coding units divided from the maximum coding unit, wherein the plurality of sub coding units have different sizes according to their depths. The image data encoder 130 outputs a bitstream by encoding the maximum coding unit based on the division shapes, i.e., the shapes which divide the maximum coding unit, as determined by the encoding depth determining unit 120.

The encoding information encoder 140 encodes information about an encoding mode of the maximum coding unit determined by the encoding depth determining unit 120. In other words, the encoding information encoder 140 outputs a bitstream by encoding information about a division shape of the maximum coding unit, information about the maximum depth, and information about an encoding mode of a sub coding unit for each depth. The information about the encoding mode of the sub coding unit can include information about a prediction unit of the sub coding unit, information about a prediction mode for each prediction unit, and information about a transformation unit of the sub coding unit.

Since sub coding units having different sizes exist for each maximum coding unit and information about an encoding mode must be determined for each sub coding unit, information about at least one encoding mode can be determined for one maximum coding unit.

The apparatus 100 can generate sub coding units by equally dividing both height and width of a maximum coding unit by two according to an increase of depth. That is, when the size of a coding unit of a $k^{th}$ depth is 2N×2N, the size of a coding unit of a $(k+1)^{th}$ depth is N×N.

Accordingly, the apparatus 100 according to an exemplary embodiment can determine an optimal division shape for each maximum coding unit based on sizes of maximum coding units and a maximum depth in consideration of image characteristics. By variably adjusting the size of a maximum coding unit in consideration of image characteristics and encoding an image through the division of a maximum coding unit into sub coding units of different depths, images having various resolutions can be more efficiently encoded.

Figure 2:
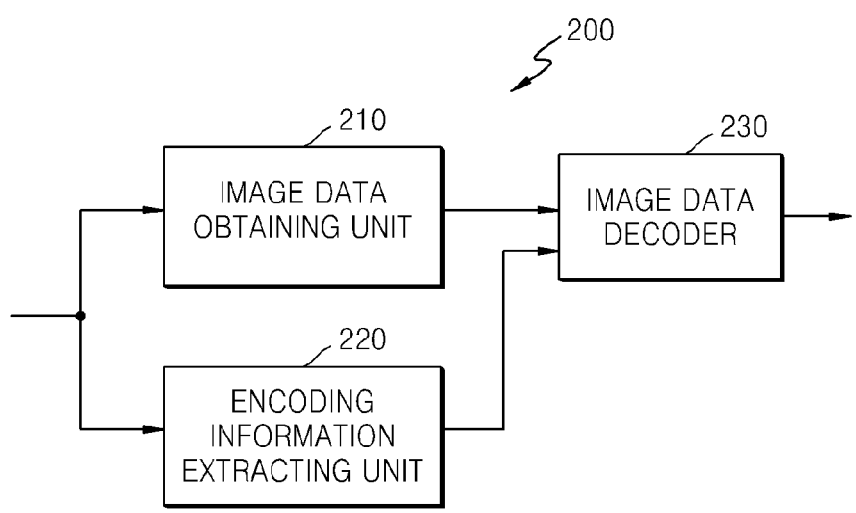
FIG. 2 is a diagram of an image decoding apparatus according to another exemplary embodiment.

FIG. 2 is a block diagram of an apparatus 200 for decoding an image according to an exemplary embodiment.

Referring to FIG. 2, the apparatus 200 includes an image data obtaining unit 210, an encoding information extracting unit 220, and an image data decoder 230.

The image data obtaining unit 210 acquires image data according to maximum coding units by parsing a bitstream received by the apparatus 200 and outputs the image data to the image data decoder 230. The image data obtaining unit 210 can extract information about a maximum coding unit of a current picture or slice from a header of the current picture or slice. In other words, the image data obtaining unit 210 divides the bitstream in the maximum coding unit so that the image data decoder 230 can decode the image data according to maximum coding units.

The encoding information extracting unit 220 extracts information about a maximum coding unit, a maximum depth, a division shape of the maximum coding unit, an encoding mode of sub coding units from the header of the current picture by parsing the bitstream received by the apparatus 200. The information about a division shape and the information about an encoding mode are provided to the image data decoder 230.

The information about a division shape of the maximum coding unit can include information about sub coding units having different sizes according to depths included in the maximum coding unit, and the information about an encoding mode can include information about a prediction unit according to sub coding unit, information about a prediction mode, and information about a transformation units.

The image data decoder 230 restores the current picture by decoding image data of every maximum coding unit based on the information extracted by the encoding information extracting unit 220. The image data decoder 230 can decode sub coding units included in a maximum coding unit based on the information about a division shape of the maximum coding unit. A decoding process can include a prediction process including intra prediction and motion compensation and an inverse transformation process.

The image data decoder 230 can perform intra prediction or inter prediction based on information about a prediction unit and information about a prediction mode in order to predict a prediction unit. The image data decoder 230 can also perform inverse transformation for each sub coding unit based on information about a transformation unit of a sub coding unit.

Figure 3:
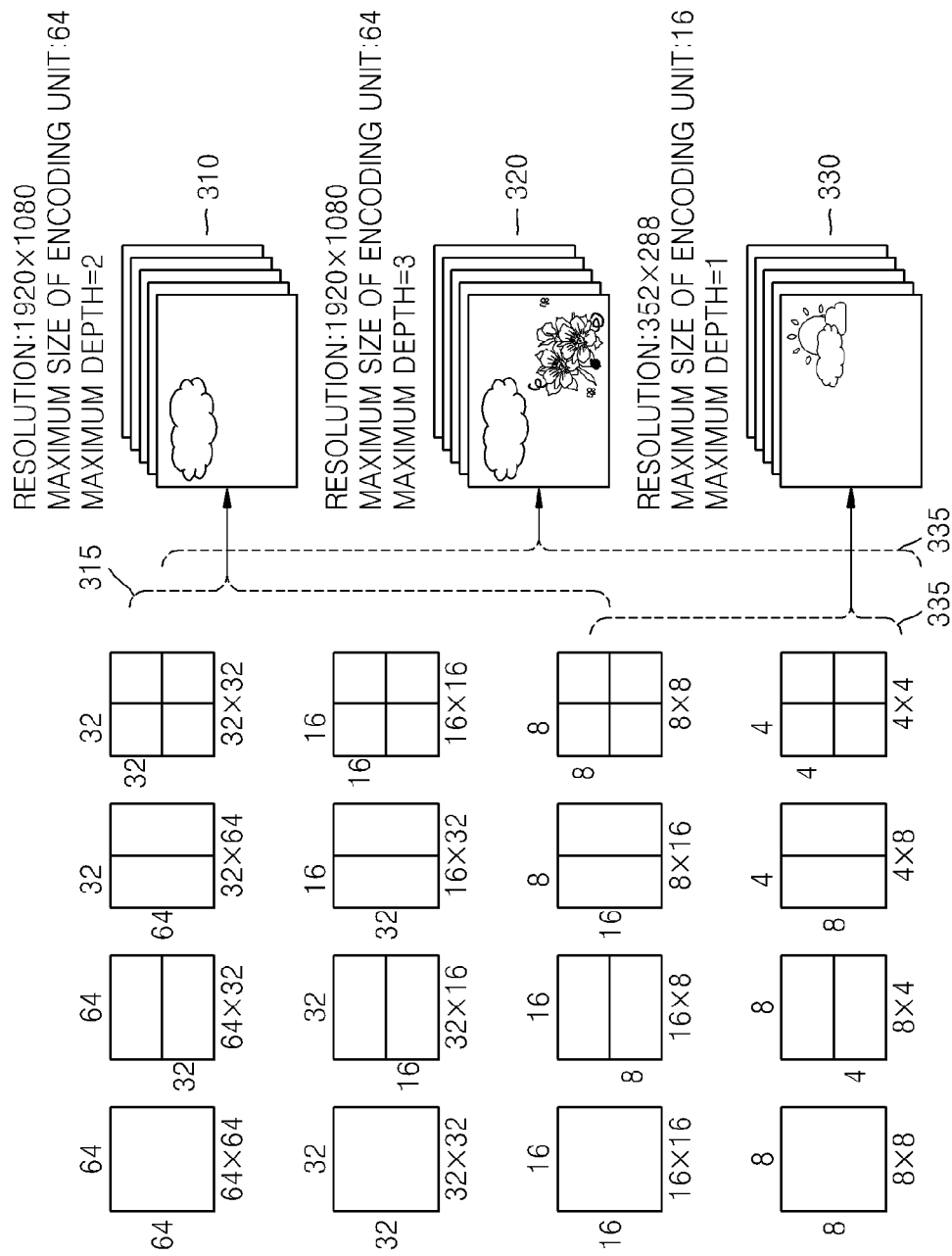
FIG. 3 is a diagram of a hierarchical coding unit according to another exemplary embodiment.

FIG. 3 illustrates hierarchical coding units according to an exemplary embodiment.

Referring to FIG. 3, the hierarchical coding units according to an exemplary embodiment can include coding units whose width×heights are 64×64, 32×32, 16×16, 8×8, and 4×4. Besides these coding units having perfect square shapes, coding units whose width×heights are 64×32, 32×64, 32×16, 16×32, 16×8, 8×16, 8×4, and 4×8 may also exist.

Referring to FIG. 3, for image data 310 whose resolution is 1920×1080, the size of a maximum coding unit is set to 64×64, and a maximum depth is set to 2.

For image data 320 whose resolution is 1920×1080, the size of a maximum coding unit is set to 64×64, and a maximum depth is set to 4. For image data 330 whose resolution is 352×288, the size of a maximum coding unit is set to 16×16, and a maximum depth is set to 1.

When the resolution is high or the amount of data is great, it is preferable, but not necessary, that a maximum size of a coding unit is relatively great to increase a compression ratio and exactly reflect image characteristics. Accordingly, for the image data 310 and 320 having higher resolution than the image data 330, 64×64 can be selected as the size of a maximum coding unit.

A maximum depth indicates the total number of layers in the hierarchical coding units. Since the maximum depth of the image data 310 is 2, a coding unit 315 of the image data 310 can include a maximum coding unit whose longer axis size is 64 and sub coding units whose longer axis sizes are 32 and 16, according to an increase of a depth.

On the other hand, since the maximum depth of the image data 330 is 1, a coding unit 335 of the image data 330 can include a maximum coding unit whose longer axis size is 16 and coding units whose longer axis sizes is 8, according to an increase of a depth.

However, since the maximum depth of the image data 320 is 4, a coding unit 325 of the image data 320 can include a maximum coding unit whose longer axis size is 64 and sub coding units whose longer axis sizes are 32, 16, 8 and 4 according to an increase of a depth. Since an image is encoded based on a smaller sub coding unit as a depth increases, the exemplary embodiment is suitable for encoding an image including more minute details in scenes.

Figure 4:
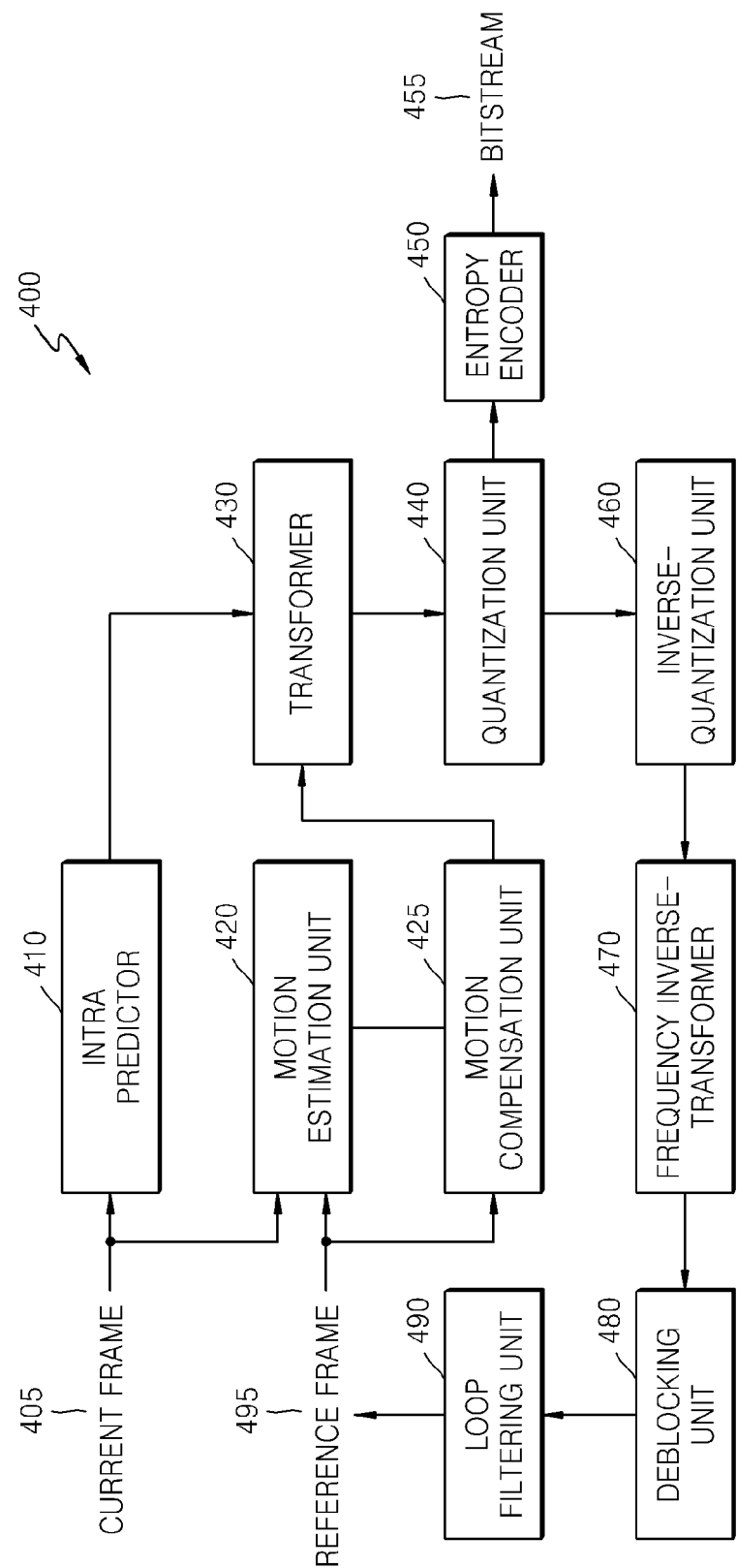
FIG. 4 is a block diagram of an image encoder based on a coding unit according to another exemplary embodiment.

FIG. 4 is a block diagram of an image encoder 400 based on a coding unit, according to an exemplary embodiment.

An intra predictor 410 performs intra prediction on prediction units of the intra mode in a current frame 405, and a motion estimation unit 420 and a motion compensation unit 425 perform inter prediction and motion compensation on prediction units of the inter mode using the current frame 405 and a reference frame 495.

Residual values are generated based on the prediction units output from the intra predictor 410, the motion estimation unit 420, and the motion compensation unit 425, and the generated residual values are output as quantized transform coefficients by passing through a transformer 430 and a quantization unit 440.

The quantized transform coefficients are restored to residual values by passing through an inverse-quantization unit 460 and a frequency inverse-transformer 470, and the restored residual values are post-processed by passing through a deblocking unit 480 and a loop filtering unit 490 and output as the reference frame 495. The quantized transform coefficients can be output as a bitstream 455 by passing through an entropy encoder 450.

To perform encoding based on an encoding method according to an exemplary embodiment, components of the image encoder 400, i.e., the intra predictor 410, the motion estimation unit 420, the motion compensation unit 425, the transformer 430, the quantization unit 440, the entropy encoder 450, the inverse-quantization unit 460, the frequency inverse-transformer 470, the deblocking unit 480 and the loop filtering unit 490, perform image encoding processes based on a maximum coding unit, a sub coding unit according to depths, a prediction unit, and a transformation unit.

Figure 5:
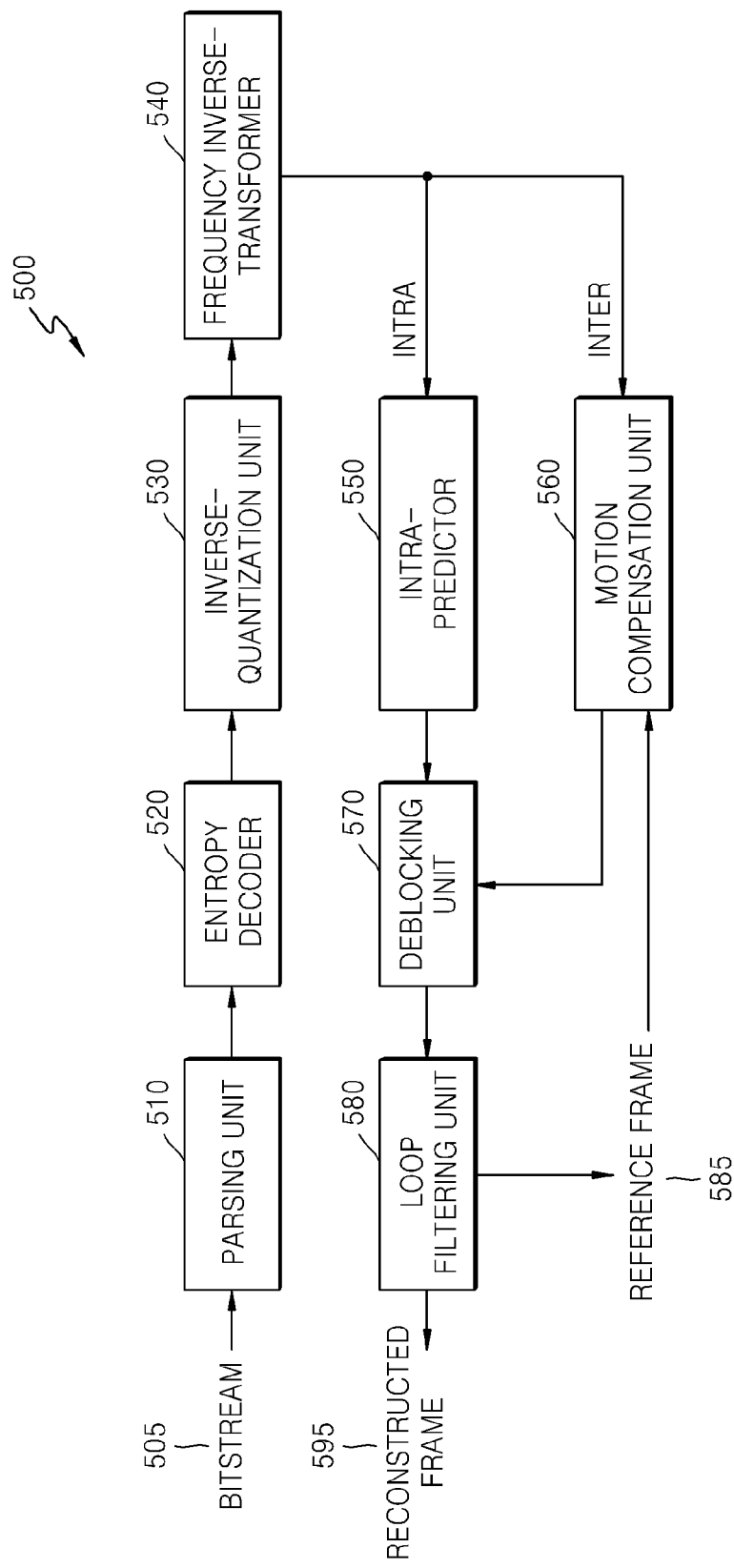
FIG. 5 is a block diagram of an image decoder based on a coding unit according to another exemplary embodiment.

FIG. 5 is a block diagram of an image decoder 500 based on a coding unit, according to an exemplary embodiment.

A bitstream 505 passes through a parsing unit 510 so that encoded image data to be decoded and encoding information necessary for decoding are parsed. The encoded image data is output as inverse-quantized data by passing through an entropy decoder 520 and an inverse-quantization unit 530 and restored to residual values by passing through a frequency inverse-transformer 540. The residual values are restored according to coding units by being added to an intra prediction result of an intra predictor 550 or a motion compensation result of a motion compensation unit 560. The restored coding units are used for prediction of next coding units or a next picture by passing through a deblocking unit 570 and a loop filtering unit 580.

To perform decoding based on a decoding method according to an exemplary embodiment, components of the image decoder 500, i.e., the parsing unit 510, the entropy decoder 520, the inverse-quantization unit 530, the frequency inverse-transformer 540, the intra predictor 550, the motion compensation unit 560, the deblocking unit 570 and the loop filtering unit 580, perform image decoding processes based on a maximum coding unit, a sub coding unit according to depths, a prediction unit, and a transformation unit.

In particular, the intra predictor 550 and the motion compensation unit 560 determine a prediction unit and a prediction mode in a sub coding unit by considering a maximum coding unit and a depth, and the frequency inverse-transformer 540 performs inverse transformation by considering the size of a transformation unit.

Figure 6:
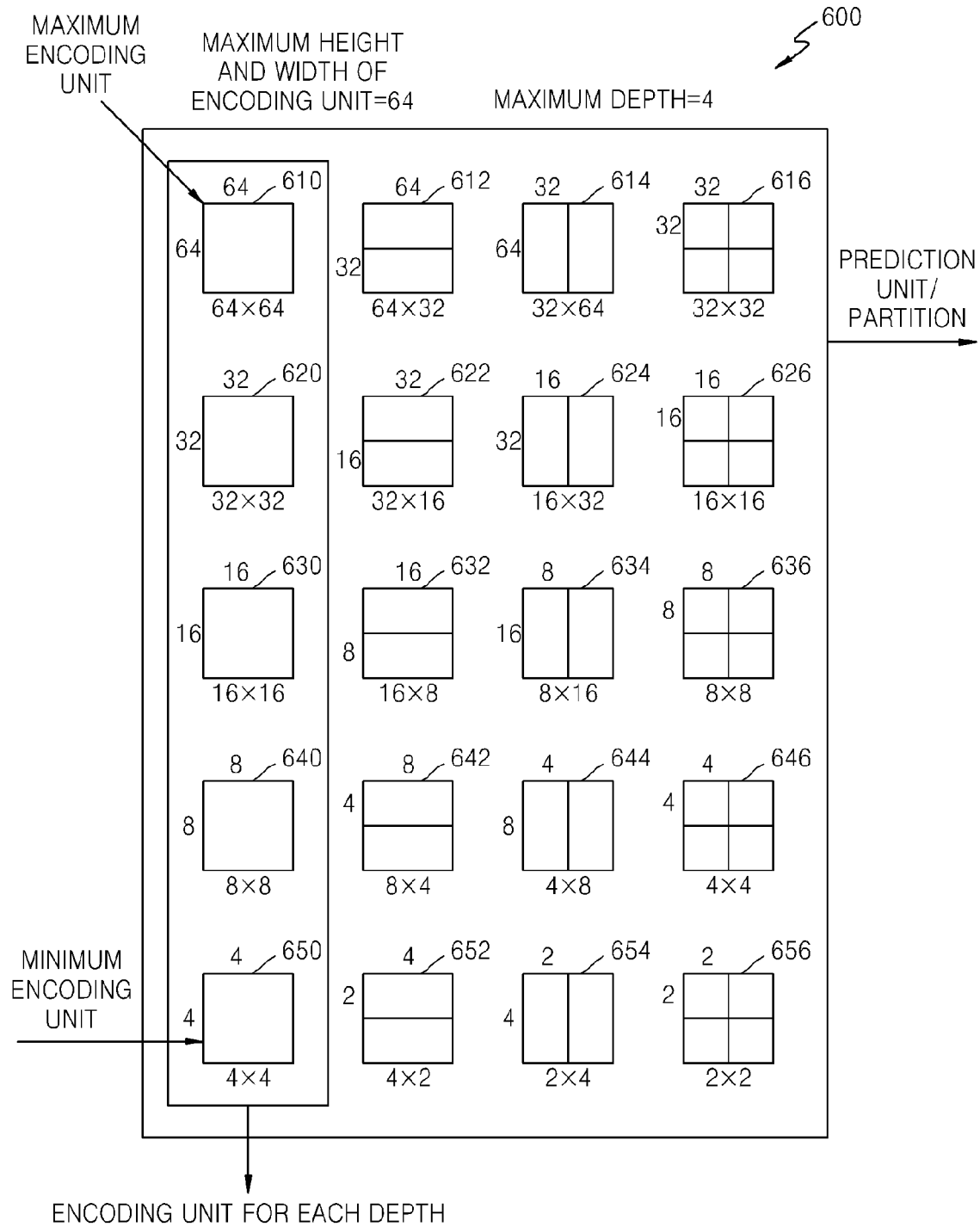
FIG. 6 illustrates a maximum coding unit, sub-coding units, and prediction units according to another exemplary embodiment.

FIG. 6 illustrates a maximum coding unit, a sub coding unit, and a prediction unit, according to an exemplary embodiment.

The apparatus 100 and the apparatus 200 according to an exemplary embodiment use hierarchical coding units to perform encoding and decoding in consideration of image characteristics. A maximum coding unit and a maximum depth can be adaptively set according to the image characteristics or variably set according to requirements of a user.

A hierarchical coding unit structure 600 according to an exemplary embodiment illustrates a maximum coding unit 610 whose height and width are 64 and maximum depth is 4. A depth increases along a vertical axis of the hierarchical coding unit structure 600, and as a depth increases, heights and widths of sub coding units 620 to 650 decrease. Prediction units of the maximum coding unit 610 and the sub coding units 620 to 650 are shown along a horizontal axis of the hierarchical coding unit structure 600.

The maximum coding unit 610 has a depth of 0 and the size of a coding unit, i.e., height and width, of 64×64. A depth increases along the vertical axis, and there exist a sub coding unit 620 whose size is 32×32 and depth is 1, a sub coding unit 630 whose size is 16×16 and depth is 2, a sub coding unit 640 whose size is 8×8 and depth is 3, and a sub coding unit 650 whose size is 4×4 and depth is 4. The sub coding unit 650 whose size is 4×4 and depth is 4 is a minimum coding unit, and the minimum coding unit may be divided into prediction units, each of which is less than the minimum coding unit.

Referring to FIG. 6, examples of a prediction unit are shown along the horizontal axis according to each depth. That is, a prediction unit of the maximum coding unit 610 whose depth is 0 may be a prediction unit whose size is equal to the coding unit 610, i.e., 64×64, or a prediction unit 612 whose size is 64×32, a prediction unit 614 whose size is 32×64, or a prediction unit 616 whose size is 32×32, which has a size smaller than the coding unit 610 whose size is 64×64.

A prediction unit of the coding unit 620 whose depth is 1 and size is 32×32 may be a prediction unit whose size is equal to the coding unit 620, i.e., 32×32, or a prediction unit 622 whose size is 32×16, a prediction unit 624 whose size is 16×32, or a prediction unit 626 whose size is 16×16, which has a size smaller than the coding unit 620 whose size is 32×32.

A prediction unit of the coding unit 630 whose depth is 2 and size is 16×16 may be a prediction unit whose size is equal to the coding unit 630, i.e., 16×16, or a prediction unit 632 whose size is 16×8, a prediction unit 634 whose size is 8×16, or a prediction unit 636 whose size is 8×8, which has a size smaller than the coding unit 630 whose size is 16×16.

A prediction unit of the coding unit 640 whose depth is 3 and size is 8×8 may be a prediction unit whose size is equal to the coding unit 640, i.e., 8×8, or a prediction unit 642 whose size is 8×4, a prediction unit 644 whose size is 4×8, or a prediction unit 646 whose size is 4×4, which has a size smaller than the coding unit 640 whose size is 8×8.

Finally, the coding unit 650 whose depth is 4 and size is 4×4 is a minimum coding unit and a coding unit of a maximum depth, and a prediction unit of the coding unit 650 may be a prediction unit 650 whose size is 4×4, a prediction unit 652 having a size of 4×2, a prediction unit 654 having a size of 2×4, or a prediction unit 656 having a size of 2×2.

Figure 7:
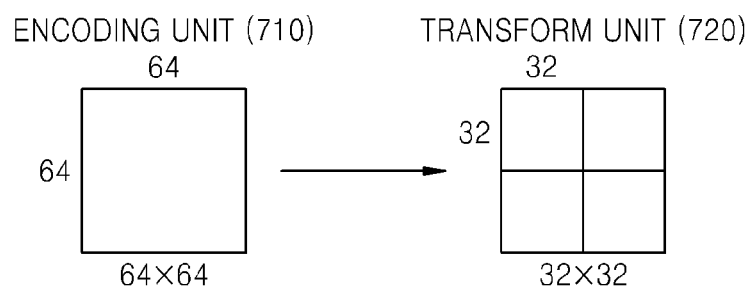
FIG. 7 is a diagram of a coding unit and a transformation unit according to another exemplary embodiment.

FIG. 7 illustrates a coding unit and a transformation unit, according to an exemplary embodiment.

The apparatus 100 and the apparatus 200, according to an exemplary embodiment, perform encoding with a maximum coding unit itself or with sub coding units, which are equal to or smaller than the maximum coding unit, divided from the maximum coding unit.

In the encoding process, the size of a transformation unit for frequency transformation is selected to be no larger than that of a corresponding coding unit. For example, when a encoding unit 710 has the size of 64×64, frequency transformation can be performed using a transformation unit 720 having the size of 32×32.

Figure 8A:
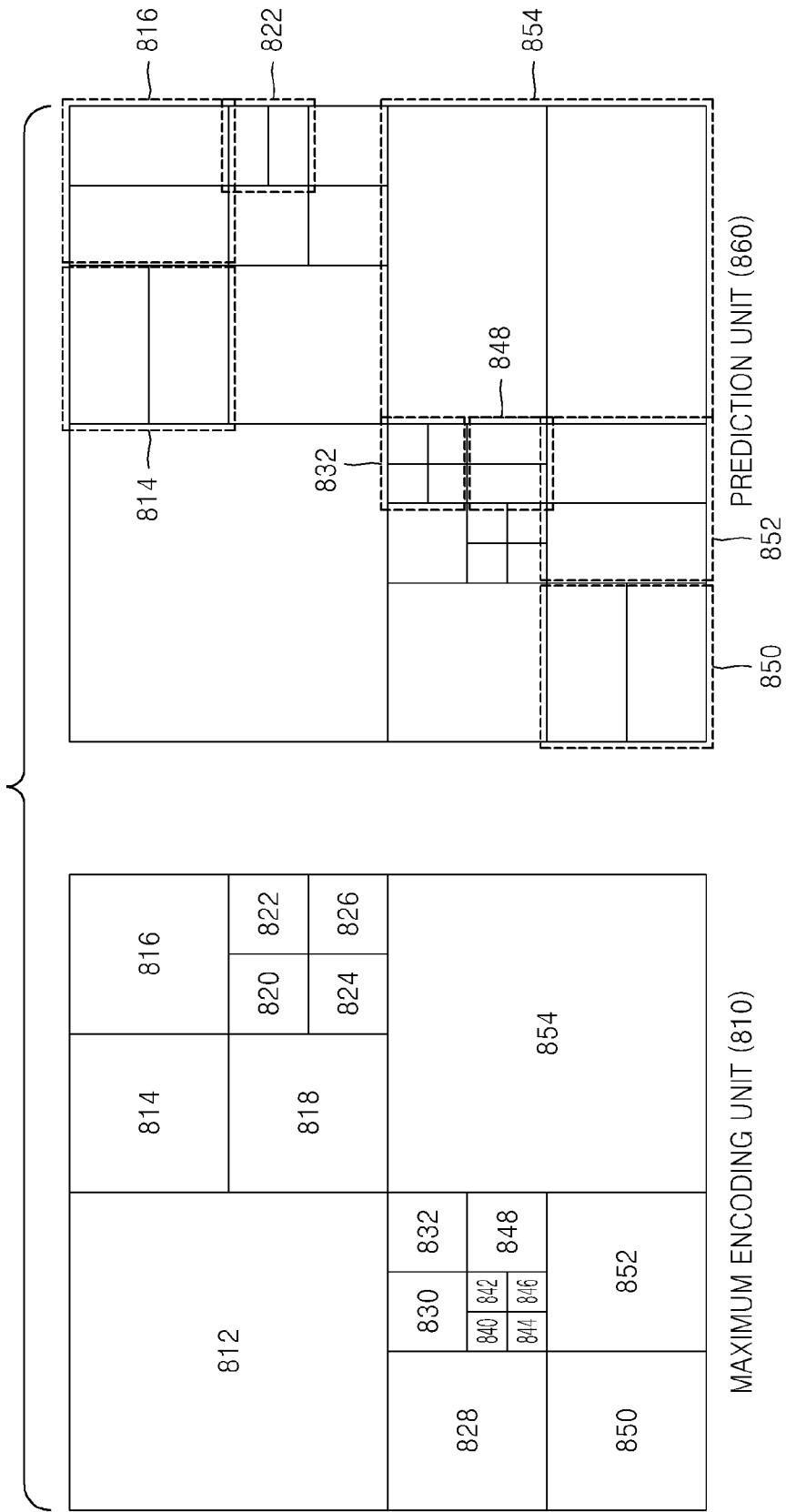

FIGS. 8A and 8B illustrate division shapes of a coding unit, a prediction unit, and a transformation unit, according to an exemplary embodiment.

FIG. 8A illustrates a coding unit and a prediction unit, according to an exemplary embodiment.

A left side of FIG. 8A shows a division shape selected by the apparatus 100, according to an exemplary embodiment, in order to encode a maximum coding unit 810. The apparatus 100 divides the maximum coding unit 810 into various shapes, performs encoding, and selects an optimal division shape by comparing encoding results of various division shapes with each other based on R-D cost. When it is optimal to encode the maximum coding unit 810 as it is, the maximum coding unit 810 may be encoded without dividing the maximum coding unit 810 as illustrated in FIGS. 8A and 8B.

Referring to the left side of FIG. 8A, the maximum coding unit 810 whose depth is 0 is encoded by dividing it into sub coding units whose depths are equal to or greater than 1. That is, the maximum coding unit 810 is divided into 4 sub coding units whose depths are 1, and all or some of the sub coding units whose depths are 1 are divided into sub coding units whose depths are 2.

A sub coding unit located in an upper-right side and a sub coding unit located in a lower-left side among the sub coding units whose depths are 1 are divided into sub coding units whose depths are equal to or greater than 2. Some of the sub coding units whose depths are equal to or greater than 2 may be divided into sub coding units whose depths are equal to or greater than 3.

The right side of FIG. 8A shows a division shape of a prediction unit for the maximum coding unit 810.

Referring to the right side of FIG. 8A, a prediction unit 860 for the maximum coding unit 810 can be divided differently from the maximum coding unit 810. In other words, a prediction unit for each of sub coding units can be smaller than a corresponding sub coding unit.

For example, a prediction unit for a sub coding unit 854 located in a lower-right side among the sub coding units whose depths are 1 can be smaller than the sub coding unit 854. In addition, prediction units for some (814, 816, 850, and 852) of sub coding units 814, 816, 818, 828, 850, and 852 whose depths are 2 can be smaller than the sub coding units 814, 816, 850, and 852, respectively. In addition, prediction units for sub coding units 822, 832, and 848 whose depths are 3 can be smaller than the sub coding units 822, 832, and 848, respectively. The prediction units may have a shape whereby respective sub coding units are equally divided by two in a direction of height or width or have a shape whereby respective sub coding units are equally divided by four in directions of height and width.

FIG. 8B illustrates a prediction unit and a transformation unit, according to an exemplary embodiment.

A left side of FIG. 8B shows a division shape of a prediction unit for the maximum coding unit 810 shown in the right side of FIG. 8A, and a right side of FIG. 8B shows a division shape of a transformation unit of the maximum coding unit 810.

Referring to the right side of FIG. 8B, a division shape of a transformation unit 870 can be set differently from the prediction unit 860.

For example, even though a prediction unit for the coding unit 854 whose depth is 1 is selected with a shape whereby the height of the coding unit 854 is equally divided by two, a transformation unit can be selected with the same size as the coding unit 854. Likewise, even though prediction units for coding units 814 and 850 whose depths are 2 are selected with a shape whereby the height of each of the coding units 814 and 850 is equally divided by two, a transformation unit can be selected with the same size as the original size of each of the coding units 814 and 850.

A transformation unit may be selected with a smaller size than a prediction unit. For example, when a prediction unit for the coding unit 852 whose depth is 2 is selected with a shape whereby the width of the coding unit 852 is equally divided by two, a transformation unit can be selected with a shape whereby the coding unit 852 is equally divided by four in directions of height and width, which has a smaller size than the shape of the prediction unit.

Figure 9:
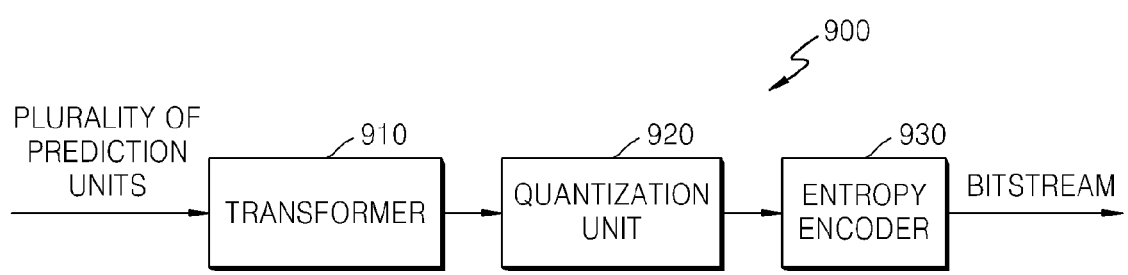
FIG. 9 is a block diagram of an image encoding apparatus according to another exemplary embodiment.

FIG. 9 is a block diagram of an image encoding apparatus 900 according to another exemplary embodiment.

Referring to FIG. 9, the image encoding apparatus 900 according to the present exemplary embodiment includes a transformer 910, a quantization unit 920, and an entropy encoder 930.

The transformer 910 receives an image processing unit of a pixel domain, and transforms the image processing unit into a frequency domain. The transformer 910 receives a plurality of prediction units including residual values generated due to intra-prediction or inter-prediction, and transforms the prediction units into a frequency domain. As a result of the transform to the frequency domain, coefficients of frequency components are generated. According to the present exemplary embodiment, the transform to the frequency domain may occur via a discrete cosine transform (DCT) or Karhunen Loeve Transform (KLT), and as a result of the DCT or KLT, coefficients of frequency domain are generated. Hereinafter, the transform to the frequency domain may be the DCT, however, it is obvious to one of ordinary skill in the art that the transform to the frequency domain may be any transform involving transformation of an image of a pixel domain into a frequency domain.

Also, according to the present exemplary embodiment, the transformer 910 sets a transformation unit by grouping a plurality of prediction units, and performs the transformation according to the transformation unit. This process will be described in detail with reference to FIGS. 10, 11A, 11B, and 12.

Figure 10:
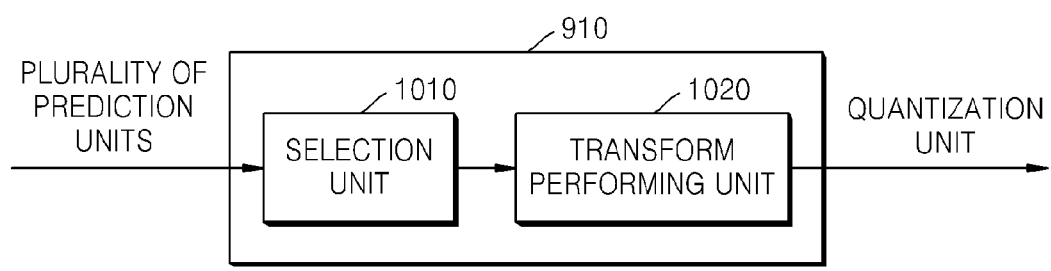
FIG. 10 is a diagram of the transformer.

FIG. 10 is a diagram of the transformer 910.

Referring to FIG. 10, the transformer 910 includes a selection unit 1010 and a transform performing unit 1020.

The selection unit 1010 sets a transformation unit by selecting a plurality of adjacent prediction units.

An image encoding apparatus according to the related art performs intra-prediction or inter-prediction according to a block having a predetermined size, i.e., according to a prediction unit, and performs the DCT based on a size that is less than or equal to that of the prediction unit. In other words, the image encoding apparatus according to the related art performs the DCT by using transformation units that are less than or equal to the prediction unit.

However, due to a plurality of pieces of header information added to the transformation units, added overheads are increased as the transformation units are decreased, such that a compression rate of an image encoding operation deteriorates. In order to solve this problem, the image encoding apparatus 900 according to the present exemplary embodiment groups a plurality of adjacent prediction units into a transformation unit, and performs transformation according to the transformation unit that is generated by the grouping. There is a high possibility that the adjacent prediction units may include similar residual values, so that, if the adjacent prediction units are grouped into one transformation unit and then the transformation is performed thereon, a compression rate of an encoding operation may be highly increased.

For this increase, the selection unit 1010 selects the adjacent prediction units to be grouped into one transformation unit. This process will be described in detail with reference to FIGS. 11A through 11C and 12.

Figure 11A:
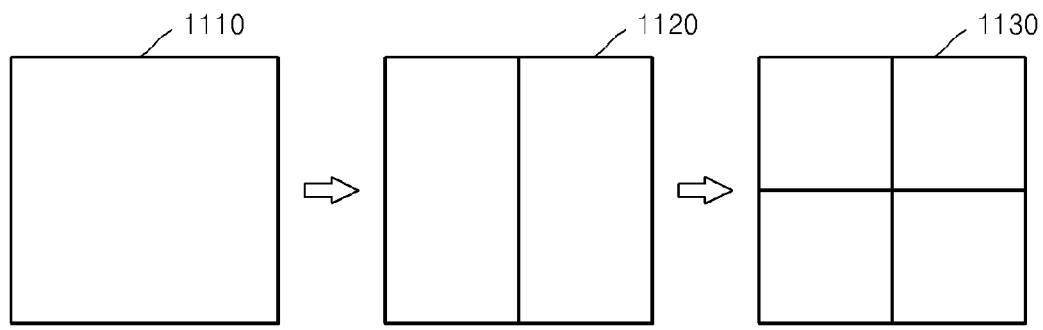
FIGS. 11A through 11C illustrate types of a transformation unit according to another exemplary embodiment.
Figure 11B:
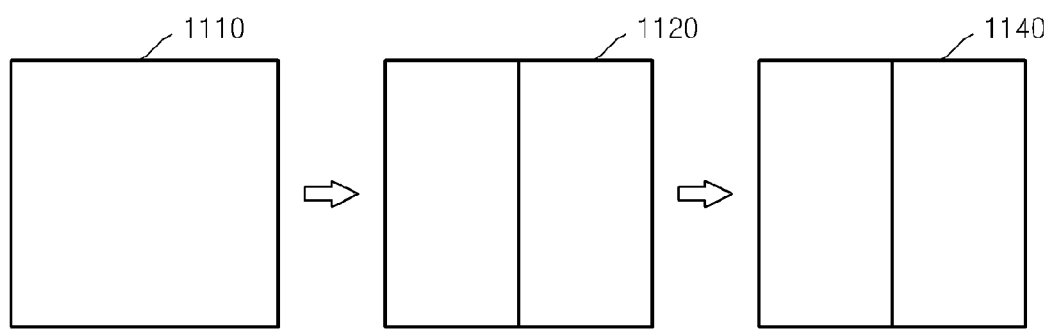
Figure 11C:
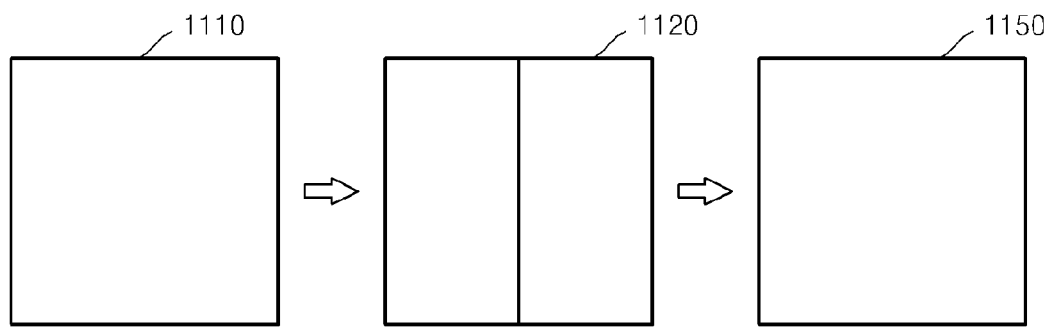

FIGS. 11A through 11C illustrate types of a transformation unit according to another exemplary embodiment.

Referring to FIGS. 11A through 11C, a prediction unit 1120 with respect to a coding unit 1110 may have a division shape obtained by halving a width of the coding unit 1110. The coding unit 1110 may be a maximum coding unit, or may be a sub-coding unit having a smaller size than the maximum coding unit.

As illustrated in FIG. 11A, a size of the transformation unit 1130 may be less than the prediction unit 1120, or as illustrated in FIG. 11B, a size of the transformation unit 1140 may be equal to the prediction unit 1120. Also, as illustrated in FIG. 11C, a size of the transformation unit 1150 may be greater than the prediction unit 1120. That is, the transformation units 1130 through 1150 may be set while having no connection with the prediction unit 1120.

Also, FIG. 11C illustrates an example in which the prediction unit 1120 is set by grouping a plurality of the prediction units 1120 included in the coding unit 1110. However, a transformation unit may be set to be greater than a coding unit in a manner that a plurality of prediction units, which are included not in one coding unit but in a plurality of coding units, are set as one transformation unit. In other words, as described with reference to FIGS. 11A through 11C, a transformation unit may be set to be equal to or less than a size of a coding unit, or to be greater than the size of the coding unit. That is, the transformation unit may be set while having no connection with the prediction unit and the coding unit.

Although FIGS. 11A through 11C illustrate examples in which the transformation unit has a square form. However, according to a method of grouping adjacent prediction units, the transformation unit may have a rectangular form. For example, in a case where the prediction unit is not set to have rectangular forms as illustrated in FIGS. 11A through 11C but is set to have four square forms obtained by quadrisecting the coding unit 1110, upper and lower prediction units, or left and right prediction units are grouped so that the transformation unit may have a rectangular form whose horizontal side or vertical side is long.

Referring back to FIG. 10, there is no limit in a criterion by which the selection unit 1010 selects the adjacent prediction units. However, according to the exemplary embodiment, the selection unit 1010 may select the transformation unit according to a depth. As described above, the depth indicates a level of size-reduction that is gradually performed from a maximum coding unit of a current slice or a current picture to a sub-coding unit. As described above with reference to FIGS. 3 and 6, as the depth is increased, a size of a sub-coding unit is decreased, and thus a prediction unit included in the sub-coding unit is also decreased. In this case, if the transformation is performed according to a transformation unit that is less than or equal to the prediction unit, a compression rate of an image encoding operation deteriorates since header information is added to every transformation unit.

Thus, with respect to a sub-coding unit at a depth of a predetermined value, it is preferable, but not necessary, that prediction units included in the sub-coding unit are grouped and set as a transformation unit, and then the transformation is performed thereon. For this, the selection unit 1010 sets the transformation unit based on the depth of the sub-coding unit. For example, in the case where a depth of the coding unit 1110 in FIG. 11C is greater than k, the selection unit 1010 groups prediction units 1120 and sets them as a transformation unit 1150.

Also, according to another exemplary embodiment, the selection unit 1010 may group a plurality of adjacent prediction units on which prediction is performed according to the same prediction mode, and may set them as one transformation unit. The selection unit 1010 groups the adjacent prediction units on which prediction is performed according to intra-prediction or inter-prediction, and then sets them as one transformation unit. Since there is a high possibility that the adjacent prediction units on which prediction is performed according to the same prediction mode include similar residual values, it is possible to group the adjacent prediction units into the transformation unit and then to perform the transformation on the adjacent prediction units.

When the selection unit 1010 sets the transformation unit, the transform performing unit 1020 transforms the adjacent prediction units into a frequency domain, according to the transformation unit. The transform performing unit 1020 performs the DCT on the adjacent prediction units according to the transformation unit, and generates discrete cosine coefficients.

Referring back to FIG. 9, the quantization unit 920 quantizes frequency component coefficients generated by the transformer 910, e.g., the discrete cosine coefficients. The quantization unit 920 may quantize the discrete cosine coefficients that are input according to a predetermined quantization step.

The entropy encoder 930 performs entropy encoding on the frequency component coefficients that are quantized by the quantization unit 920. The entropy encoder 930 may perform the entropy encoding on the discrete cosine coefficients by using context-adaptive variable arithmetic coding (CABAC) or context-adaptive variable length coding (CAVLC).

The image encoding apparatus 900 may determine an optimal transformation unit by repeatedly performing the DCT, the quantization, and the entropy encoding on different transformation units. A procedure for selecting the adjacent prediction units may be repeated to determine the optimal transformation unit. The optimal transformation unit may be determined in consideration of an RD cost calculation, and this will be described in detail with reference to FIG. 12.

Figure 12:
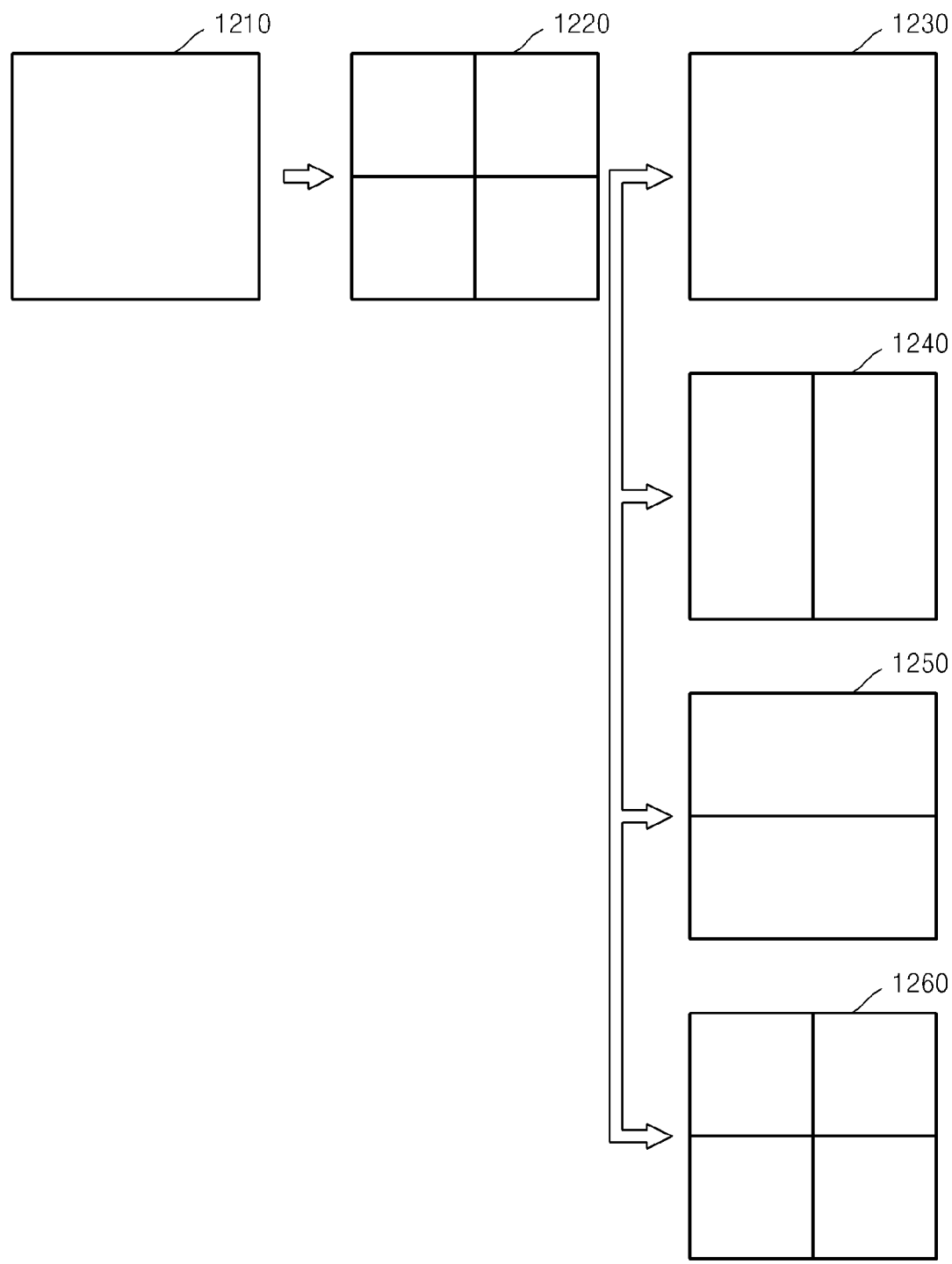
FIG. 12 illustrates different transformation units according to another exemplary embodiment.

FIG. 12 illustrates different transformation units according to another exemplary embodiment.

Referring to FIG. 12, the image encoding apparatus 900 repeatedly performs an encoding operation on the different transformation units.

As illustrated in FIG. 12, a coding unit 1210 may be predicted and encoded based on a prediction unit 1220 having a smaller size than the coding unit 1210. A transformation is performed on residual values that are generated by a result of the prediction, and here, as illustrated in FIG. 12, the DCT may be performed on the residual values based on the different transformation units.

A first-illustrated transformation unit 1230 has the same size as the coding unit 1210, and has a size obtained by grouping all prediction units included in the coding unit 1210.

A second-illustrated transformation unit 1240 has sizes obtained by halving a width of the coding unit 1210, and the sizes are obtained by grouping every two prediction units adjacent to each other in a vertical direction, respectively.

A third-illustrated transformation unit 1250 has sizes obtained by halving a height of the coding unit 1210, and the sizes are obtained by grouping every two prediction units adjacent to each other in a horizontal direction, respectively.

A fourth-illustrated transformation unit 1260 is used when the transformation is performed based on the fourth-illustrated transformation unit 1260 having the same size as the prediction unit 1220.

Figure 13:
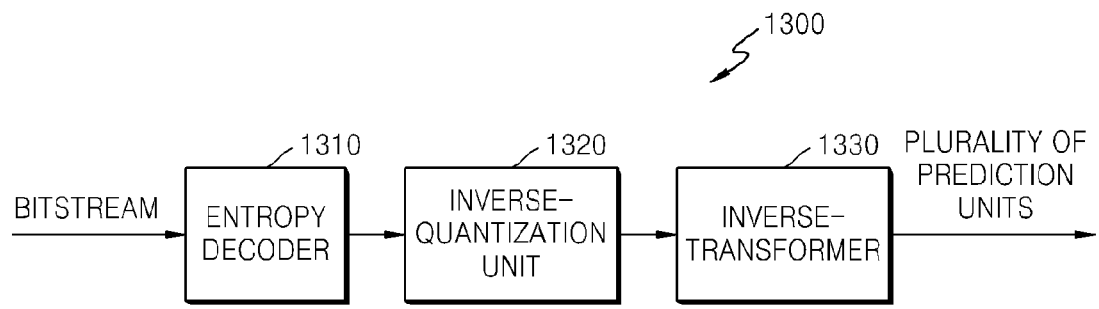
FIG. 13 is a block diagram of an image decoding apparatus according to another exemplary embodiment.

FIG. 13 is a block diagram of an image decoding apparatus 1300 according to another exemplary embodiment.

Referring to FIG. 13, the image decoding apparatus 1300 according to the present exemplary embodiment includes an entropy decoder 1310, an inverse-quantization unit 1320, and an inverse-transformer 1330.

The entropy decoder 1310 performs entropy decoding on frequency component coefficients with respect to a predetermined transformation unit. As described above with reference to FIGS. 11A through 11C and 12, the predetermined transformation unit may be a transformation unit generated by grouping a plurality of adjacent prediction units.

As described above with reference to the image encoding apparatus 900, the transformation unit may be generated by grouping the adjacent prediction units according to a depth, or may be generated by grouping a plurality of adjacent prediction units on which prediction is performed according to the same prediction mode, that is, according to an intra-prediction mode or an inter-prediction mode.

The plurality of prediction units may not be included in one coding unit but included in a plurality of coding units. In other words, as described above with reference to FIGS. 11A through 11C, the transformation unit that is entropy-decoded by the entropy decoder 1310 may be set to be equal to or less than a size of a coding unit, or to be greater than the size of the coding unit.

Also, as described above with reference to FIG. 12, the transformation unit may be an optimal transformation unit selected by repeating a procedure for grouping a plurality of adjacent prediction units, and by repeatedly performing a transformation, quantization, and entropy decoding on different transformation units.

The inverse-quantization unit 1320 inverse-quantizes the frequency component coefficients that are entropy-decoded by the entropy decoder 1310.

The inverse-quantization unit 1320 inverse-quantizes the entropy-decoded frequency component coefficients according to a quantization step that is used in encoding of the transformation unit.

The inverse-transformer 1330 inverse-transforms the inverse-quantized frequency component coefficients into a pixel domain. The inverse-transformer may perform an inverse-DCT on inverse-quantized discrete cosine coefficients (i.e., the inverse-quantized frequency component coefficients), and then may reconstruct a transformation unit of the pixel domain. The reconstructed transformation unit may include adjacent prediction units.

Figure 14:
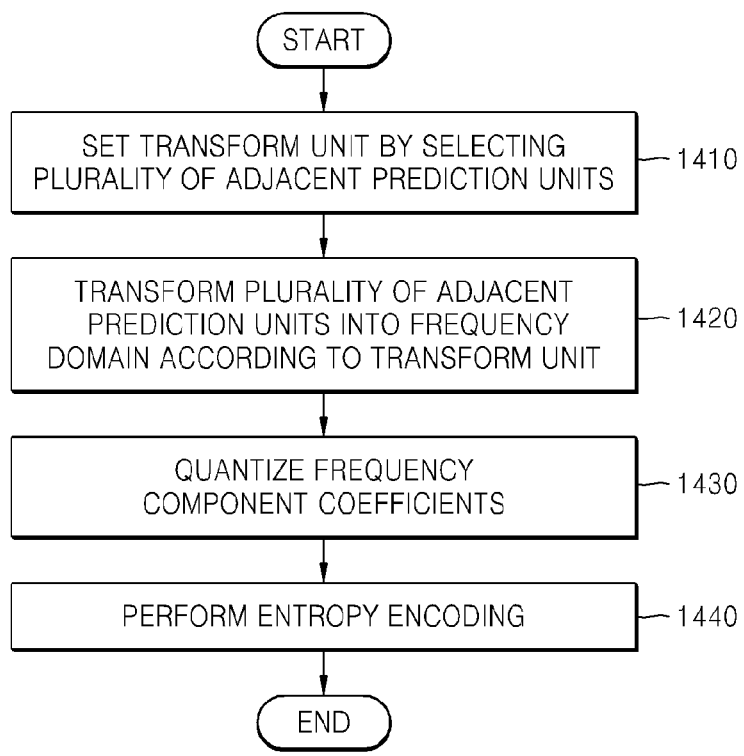
FIG. 14 is a flowchart of an image encoding method, according to an exemplary embodiment.

FIG. 14 is a flowchart of an image encoding method, according to an exemplary embodiment.

Referring to FIG. 14, in operation 1410, an image encoding apparatus sets a transformation unit by selecting a plurality of adjacent prediction units. The image encoding apparatus may select a plurality of adjacent prediction units according to a depth, or may select a plurality of adjacent prediction units on which prediction is performed according to the same prediction mode.

In operation 1420, the image encoding apparatus transforms the adjacent prediction units into a frequency domain according to the transformation unit set in operation 1420. The image encoding apparatus groups the adjacent prediction units, performs a DCT on the adjacent prediction units, and thus generates discrete cosine coefficients.

In operation 1430, the image encoding apparatus quantizes frequency component coefficients, generated in operation 1420, according to a quantization step.

In operation 1440, the image encoding apparatus performs entropy encoding on the frequency component coefficients quantized in operation 1430. The image encoding apparatus performs the entropy encoding on the discrete cosine coefficients by using CABAC or CAVLC.

An image encoding method according to another exemplary embodiment may further include an operation of setting an optimal transformation unit by repeatedly performing operations 1410 through 1440 on different transformation units. That is, by repeatedly performing the transformation, the quantization, and the entropy encoding on different transformation units as illustrated in FIG. 12, it is possible to set the optimal transformation unit.

Figure 15:
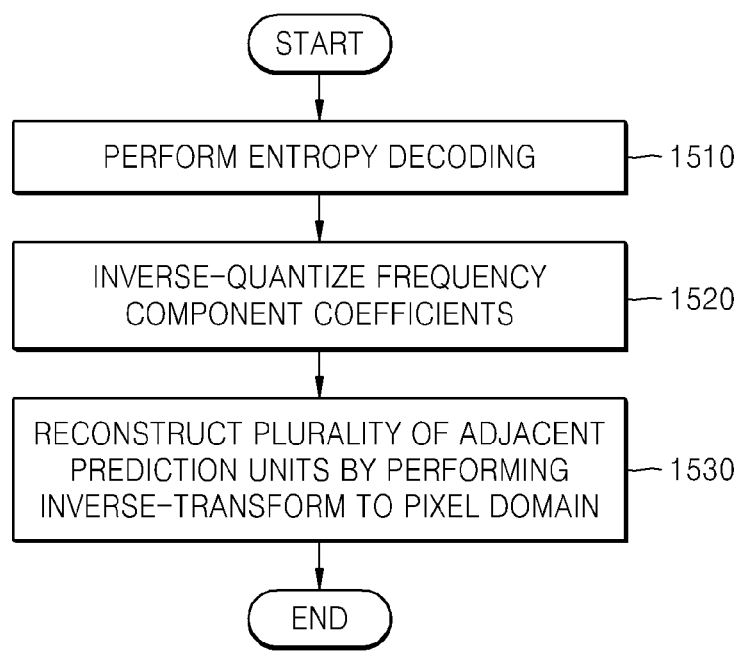
FIG. 15 is a flowchart of an image decoding method, according to another exemplary embodiment.

FIG. 15 is a flowchart of an image decoding method, according to another exemplary embodiment.

Referring to FIG. 15, in operation 1510, an image decoding apparatus performs entropy decoding on frequency component coefficients with respect to a predetermined transformation unit. The frequency component coefficients may be discrete cosine coefficients.

In operation 1520, the image decoding apparatus inverse-quantizes the frequency component coefficients that are entropy-decoded in operation 1510. The image decoding apparatus inverse-quantizes the discrete cosine coefficients by using a quantization step used in an encoding operation.

In operation 1530, the image decoding apparatus inverse-transforms the frequency component coefficients, which have been inverse-quantized in operation 1520, into a pixel domain and then reconstructs the transformation unit. The reconstructed transformation unit is set by grouping a plurality of adjacent prediction units. As described above, the transformation unit may be set by grouping the adjacent prediction units according to a depth, or may be set by grouping a plurality of adjacent prediction units on which prediction is performed according to the same prediction mode.

According to the one or more exemplary embodiments, it is possible to set the transformation unit so as to be greater than the prediction unit, and to perform the DCT, so that an image may be efficiently compressed and encoded.

The exemplary embodiments can also be embodied as computer-readable codes on a computer-readable recording medium. The computer-readable recording medium is any data storage device that can store data, which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion.

For example, each of the image encoding apparatus, the image decoding apparatus, the image encoder, and the image decoder according to the one or more embodiments may include a bus coupled to each unit in an apparatus as illustrated in FIGS. 1-2, 4-5, 9-10, and 14, and at least one processor coupled to the bus. Also, each of the image encoding apparatus, the image decoding apparatus, the image encoder, and the image decoder according to the one or more embodiments may include a memory coupled to the at least one processor that is coupled to the bus so as to store commands, received messages or generated messages, and to execute the commands.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of decoding image, the method comprising:
determining coding units having a hierarchical structure for decoding an image using split information of a coding unit, determining at least one prediction unit for predicting a coding unit among the coding units using information about a partition type, and determining at least one transformation unit for inversely transforming the coding unit using information about a depth of the at least one transformation information about a depth of the at least one transformation unit are parsed from a bitstream;
obtaining, from the bitstream, transformation coefficients generated by transformation according to the at least one transformation unit generated by dividing the coding unit, and reconstructing a residual of the at least one transformation unit by performing inverse quantization and inverse transformation on the parsed transformation coefficients; and
performing intra prediction or inter prediction on the at least one prediction unit to generate a predictor, and reconstructing the image based on the residual and the predictor,
wherein the coding units are split hierarchically according to a depth of the coding unit, and
wherein a size of the at least one transformation unit in the coding unit is determined without considering a size of the at least one prediction unit in the coding unit,
the image is split into a plurality of maximum coding units, according to information about a maximum size of the coding unit,
the maximum coding unit is hierarchically split into one or more coding units of depth including at least one of a current depth and a lower depth, according to split information,
when the split information indicates a split for the current depth, the coding unit of the current depth is split into four rectangular coding units of a lower depth, independently from neighboring coding units, and
when the split information indicates a non-split of the lower depth, the at least one prediction unit is obtained from the coding unit of the lower depth.

2. The method of claim 1, wherein the at least one prediction unit comprises a plurality of prediction units, and
wherein the at least one transformation unit comprises a transformation unit having a larger size than the size of the plurality of prediction units.

3. The method of claim 1, wherein the size of the at least one transformation unit is different from the size of the least one prediction unit and a size of the coding unit.

* * * * *

UNITED STATES PATENT AND TRADEMARK OFFICE
CERTIFICATE OF CORRECTION

| | | |
|---|---|---|
| PATENT NO. | : 8,798,381 B2 | Page 1 of 1 |
| APPLICATION NO. | : 13/969721 | |
| DATED | : August 5, 2014 | |
| INVENTOR(S) | : Tammy Lee et al. | |

It is certified that error appears in the above-identified patent and that said Letters Patent is hereby corrected as shown below:

In the Claims

Column 15, line 15, after the phrase "least one transformation"
Insert -- unit, wherein the split information of a coding unit, the information about a partition type and the --

Signed and Sealed this
Seventh Day of July, 2015

Michelle K. Lee
*Director of the United States Patent and Trademark Office*